United States Patent
Maeda et al.

(10) Patent No.: US 8,561,999 B2
(45) Date of Patent: Oct. 22, 2013

(54) SEALING DEVICE AND PRODUCTION METHOD THEREOF

(75) Inventors: Toshiyuki Maeda, Nihonmatsu (JP); Yoshiyuki Abe, Nihonmatsu (JP)

(73) Assignee: NOK Corporation, Tokyo (JP)

( * ) Notice: Subject to any disclaimer, the term of this patent is extended or adjusted under 35 U.S.C. 154(b) by 321 days.

(21) Appl. No.: 12/518,794

(22) PCT Filed: Dec. 14, 2007

(86) PCT No.: PCT/JP2007/074145
§ 371 (c)(1),
(2), (4) Date: Jun. 11, 2009

(87) PCT Pub. No.: WO2008/072738
PCT Pub. Date: Jun. 19, 2008

(65) Prior Publication Data
US 2010/0084820 A1 Apr. 8, 2010

(30) Foreign Application Priority Data
Dec. 14, 2006 (JP) .................. 2006-336693

(51) Int. Cl.
*F16J 9/12* (2006.01)
(52) U.S. Cl.
USPC ............ 277/465; 277/472; 277/459

(58) Field of Classification Search
USPC ............ 277/467, 468, 469, 472, 500, 578
See application file for complete search history.

(56) References Cited

U.S. PATENT DOCUMENTS 4,774,393 A * 9/1988 Tarumoto et al. ........ 219/121.69

FOREIGN PATENT DOCUMENTS

| JP | 47-14165 | B1 | | 4/1972 |
| JP | 63-34370 | A | | 2/1988 |
| JP | 2-84061 | U | | 6/1990 |
| JP | 03079341 | A | * | 4/1991 |
| JP | 4-136364 | U | | 12/1992 |
| JP | 9-250640 | A | | 9/1997 |
| JP | 10-213231 | A | | 8/1998 |
| WO | WO 2007063739 | A1 | * | 6/2007 |

* cited by examiner

*Primary Examiner* — Gilbert Lee
(74) *Attorney, Agent, or Firm* — Harness, Dickey & Pierce, P.L.C.

(57) ABSTRACT

A sealing device is provided which is capable of reducing its sliding resistance. In a sealing device 1 which is fitted into an annular groove formed in one of a housing with a shaft hole and a shaft inserted into said shaft hole and serves to seal an annular gap between these two members, and which includes a seal ring 2 made of a resin that is in sliding contact with the other of the two members, and an elastic ring 3 that is fitted between the seal ring 2 and the annular groove, the seal ring has a plurality of concave portions 22 formed on its sliding surface 20 which is in sliding contact with the other member.

5 Claims, 13 Drawing Sheets

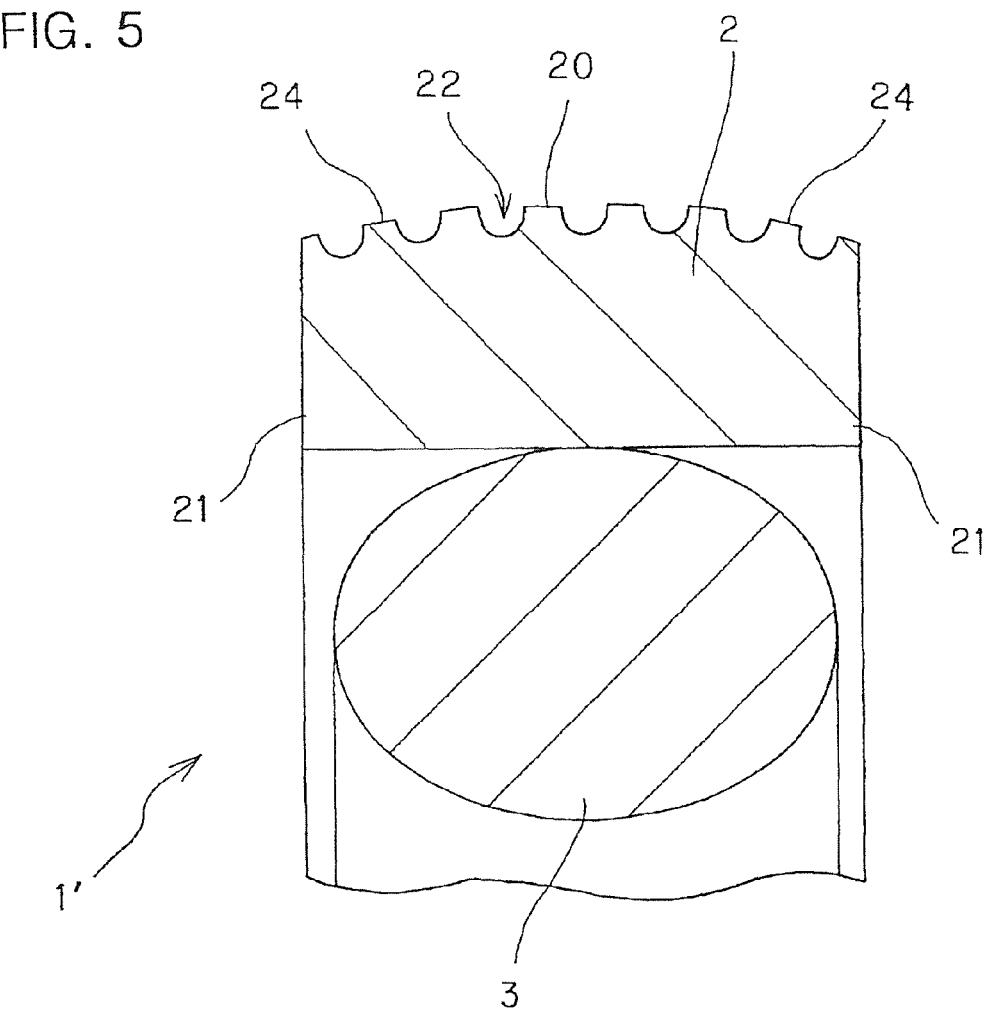

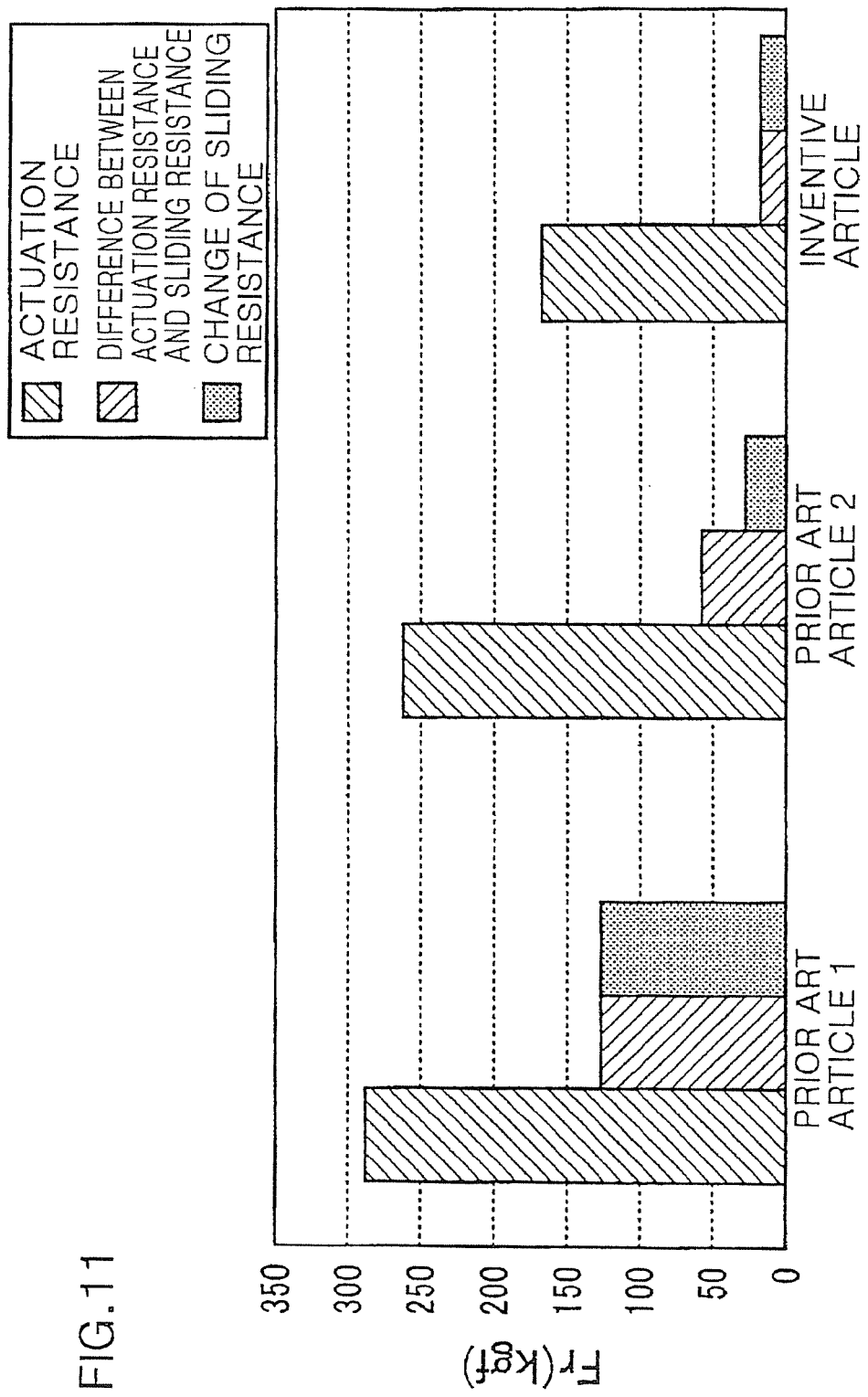

FIG.13
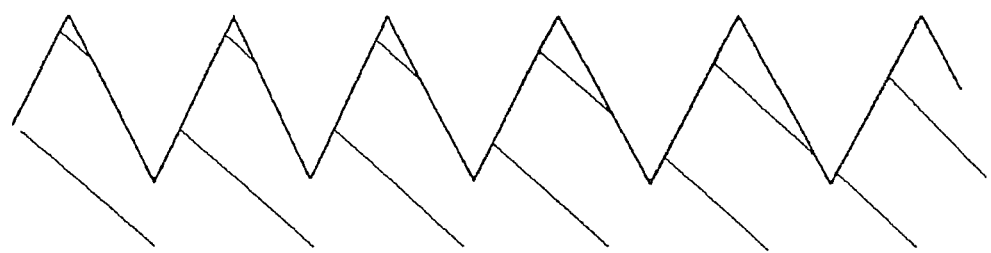
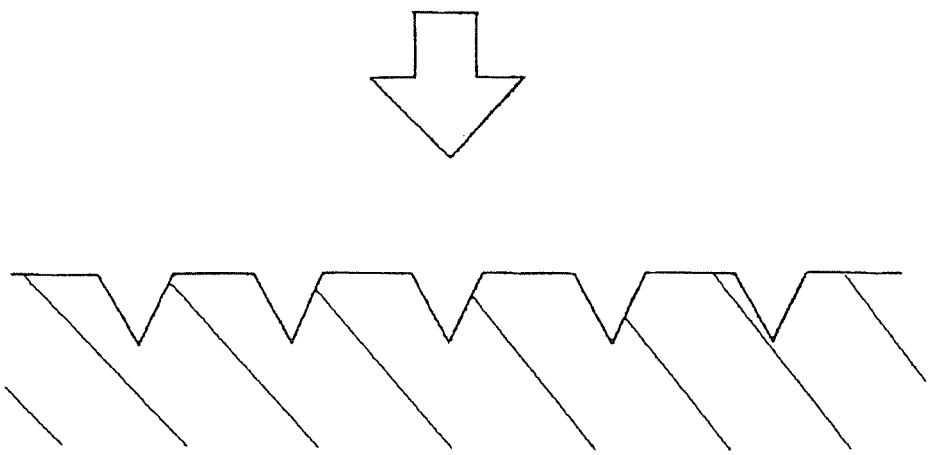

SEALING DEVICE AND PRODUCTION METHOD THEREOF

CROSS-REFERENCE TO RELATED APPLICATIONS

This application is a 371 U.S. National Stage of International Application No. PCT/JP2007/074145, filed Dec. 14, 2007. This application claims the benefit of Japanese Patent Application No. JP 2006-336693, filed Dec. 14, 2006. The disclosures of the above applications are expressly incorporated herein by reference.

TECHNICAL FIELD

The present invention relates to a sealing device used for a hydraulic cylinder or the like as well as to a production method of the sealing device.

BACKGROUND ART

In sealing devices used for hydraulic cylinders that are adapted to be used as driving means for construction machinery, there have been proposed a variety of types of sealing devices in order to improve the lubrication property of sliding surfaces (see under-mentioned individual patent documents).

For example, in a patent document 1, a sealing device is proposed which is constructed of a seal ring made of PTFE (polytetrafluoroethylene resin) and a thrust ring made of a rubbery elastic material is proposed. Although this sealing device is intended to reduce sliding resistance by the use of PTFE for the seal ring which slides with respect to a counterpart member, it is inferior, in pressure resisting ability against hydraulic pressure, to those made of nylon (polyamide type resin), so it would sometimes be damaged or broken upon application of high pressure while giving rise to a phenomenon of protrusion. In addition, a spiral groove formed on a sliding surface of the seal ring acts to place a pressure side and a non-pressure side in communication with each other to form an oil leakage passage, as a result of which there is a problem of low sealing performance.

In addition, in a patent document 2, there is proposed a sealing device which is intended to improve the lubrication property by providing a plurality of annular protrusions on a sliding surface of a seal ring, which serve to retain lubricant. However, there is the following problem. That is, even if a flaw or the like is generated in each annular protrusion at one place thereof, lubrication grooves between adjacent ones of the individual annular protrusions are placed in communication with each other, so that a leakage passage leading from a pressure side up to a non-pressure side is liable to be formed, thus easily reducing the sealing performance. In another words, it can be said that a safety factor with respect to the sealing performance is low.

Moreover, in a patent document 3, there is proposed a sealing device which is intended to improve the lubrication property by providing a plurality of holes which serve to connect between an inner peripheral surface and an outer peripheral surface of a low friction ring, but there is a problem that the strength of the low friction ring itself is decreased due to the provision of the holes. In addition, there is also another problem that upon application of high pressure, an elastic seal ring (a back ring made of rubber) is caused to protrude into the holes in the inner peripheral surface of the low friction ring, thus resulting in its damage.

Here, reference will be made to a sealing device that is proposed in a patent document 4, while referring to FIG. 12.

FIG. 12 is a schematic cross sectional view of the sealing device according to the prior art.

A sealing device 100 serves to seal up an annular gap between an inner peripheral surface of a hydraulic cylinder 400 and an outer peripheral surface of a piston 500, and it is fitted into an annular groove 600 formed on the outer peripheral surface of the piston 500. The sealing device 100 comprises a seal ring 200 made of nylon that is in sliding contact with the inner peripheral surface of the hydraulic cylinder 400, and an elastic ring 300 that is fitted between the seal ring 200 and a groove bottom of an annular groove 600 for pushing the seal ring 200 against the inner peripheral surface of the hydraulic cylinder 400.

This sealing device 100 has an annular oil groove 700 which is formed on an outer peripheral surface of the seal ring 200, i.e., a sliding surface thereof in sliding contact with the inner peripheral surface of the hydraulic cylinder 400, along a circumferential direction thereof. This oil groove 700 functions as a pressure chamber due to the generation of accumulated pressure caused by the pressure of accumulated fluid to be sealed, whereby it serves to lubricate sliding portions and at the same time reduce an expanding force acting on the seal ring, thus making it possible to achieve a reduction in the sliding resistance of the seal ring.

However, when flaws or the like are generated in a pair of annular protrusions, respectively, which form opposite side walls of the oil groove 700, a leakage passage for the fluid to be sealed might be formed, thereby giving rise to a fear that the sealing performance of the seal ring 200 might be easily decreased. In addition, in order for the oil groove 700 to exhibit the function of the pressure chamber to a satisfactory extent, a prescribed sliding distance is required, and hence there is a possibility that an expected effect might not be achieved in an initial stage of operation.

Further, to solve these problems, there is proposed a method in which a sliding surface of a seal ring is processed by means of shot processing or the like so as to roughen the surface, thereby providing the surface with minute irregularities. However, there is the following problem. That is, as shown in FIG. 13, those portions lying between adjacent concave portions become pointed protrusions, so high surface pressure will be generated at these protrusions, whereby the minute irregularities will be worn out in a relatively early time. Here, note that FIG. 13 is a schematic cross sectional view of the irregularities formed by means of shot processing.

In addition, in case where nylon is used as a material for the piston seal, the pressure resisting ability is more excellent but the sliding resistance becomes higher, in comparison with the case of using PTFE, so there is a problem that when a hydraulic cylinder is operated, a so-called stick-slip phenomenon will occur, thus ma king it easy to generate vibration.

Moreover, as a high pressure piston seal, there has also been known a sealing device which comprises a seal ring made of PTFE, back-up rings made of nylon arranged at opposite sides of the seal ring, and a biasing ring for biasing these rings (for example, a patent document 8). However, this sealing device is composed of the four members, and hence has a problem in that it is poor from a cost point of view.

Patent Document 1: Japanese utility model application laid-open No. S60-101265
Patent Document 2: Japanese patent application laid-open No. H09-250640
Patent Document 3: Japanese utility model application laid-open No. S58-16459
Patent Document 4: Japanese patent application laid-open No. H10-213231
Patent Document 5: Japanese patent No. 3114874

Patent Document 6: Japanese utility model application laid-open No. H04-136364
Patent Document 7: Japanese utility model application laid-open No. H04-129969
Patent Document 8: Japanese utility model application laid-open No. S59-180056

DISCLOSURE OF THE INVENTION

Problems to be Solved by the Invention

The present invention has been made to solve the problems of the prior art as referred to above, and has for its object to provide a sealing device which is intended to be capable of reducing its sliding resistance. In addition, another object of the present invention is to provide a sealing device which can be produced at low cost while maintaining the function of a conventional sealing device.

Means for Solving the Problems

In order to achieve the above objects, a sealing device according to the present invention which is fitted into an annular groove formed in one of a housing with a shaft hole and a shaft inserted into the shaft hole and serves to seal an annular gap between these two members, and which includes a seal ring made of a resin that is in sliding contact with the other of said two members, and an elastic ring that is fitted between said seal ring and said annular groove, is characterized in that said seal ring has a plurality of concave portions formed on its sliding surface which is in sliding contact with the other member.

With this arrangement, a part of fluid to be sealed, which has leaked out from a region to be sealed to the sliding surface, is held or retained in the plurality of concave portions, respectively, formed on the sliding surface, whereby the state of lubrication of the sliding surface on the seal ring due to a lubricating film formed of the fluid to be sealed becomes excellent. In addition, a chamber, which is defined by the concave portions and a surface of the other member, functions as a pressure chamber, so that the contact pressure of the seal ring with respect to the other member is reduced by the pressure of the fluid to be sealed that is accumulated in the chamber, thus making it possible to reduce the sliding resistance thereof.

Said seal ring may preferably has convex portions which are formed so as to enclose said concave portions, respectively, and which rise from said sliding surface and at the same time have initial sliding surfaces, respectively.

With such an arrangement, in the initial time of operation until the fluid to be sealed has accumulated in the concave portions, only the initial sliding surfaces of the convex portions rising around the concave portions, respectively, become in sliding contact with the other member, so the contact areas of the seal ring with the other member becomes small, thus making it possible to reduce the sliding resistance. Accordingly, the sliding resistance until the formation of a stable lubricating film can be reduced, and the generation of stick-slip can be suppressed.

Further, the fluid to be sealed enters gaps which are formed between the adjacent individual convex portions, whereby the fluid to be sealed can be positively introduced into the sliding surface, and the accumulation of the fluid to be sealed in the concave portions can be made faster, and at the same time the state of lubrication of the sliding surface at the time of system starting (initial operation stage) can be made excellent.

In addition, at the time when the convex portions are worn out due to the sliding contact thereof with the other member, a sufficient amount of fluid to be sealed is accumulated in the concave portions and at the same time a sufficient lubricating film is formed on the sliding surface, thereby making it possible to maintain an excellent lubrication state.

Said concave portions may preferably be formed by irradiating laser to said sliding surface, and said convex portions may be formed by rising of a material around opening portions of said concave portions, respectively, which is melted by the irradiation of the laser.

Thus, the concave portions and the convex portions can be formed in a simple and easy manner.

Said seal ring may preferably be made of a resin material of which a base polymer is a thermoplastic resin.

Thus, the pressure resisting ability or property can be made higher, so a stable seal performance can be exhibited. In addition, in case where the concave portions are formed by means of laser processing, the convex portions can be easily formed of a part of the material melted due to the heat of the laser.

Moreover, in order to achieve the above-mentioned objects, a production method of a sealing device according to the present invention is a method for producing the above-mentioned sealing device, and is characterized by comprising forming said concave portions by irradiating laser to said sliding surface, and forming said convex portions by rising of a material around opening portions of said concave portions, respectively, which is melted by the irradiation of the laser.

With this method, the concave portions and the convex portions can be formed in a simple and easy manner.

Said seal ring may preferably be made of a resin material of which a base polymer is a thermoplastic resin.

Thus, the pressure resisting ability or property can be enhanced, so a stable seal performance can be exhibited. Also, in case where the concave portions are formed by means of laser processing, it is possible to form the convex portions by a part of the material melted due to the heat of the laser in an easy manner.

Effects of the Invention

As described in the foregoing, according to the present invention, it is possible to achieve a reduction in the sliding resistance. In addition, a general-purpose resin can be used for a high pressure piston seal comprising four members because of the improvement in the sliding property of the seal ring, and hence the cost of materials can be reduced, thus making it possible to produce the piston seal at low cost. Further, in a sealing device comprising two members of a seal ring made of a resin and an elastic ring, if PTFE is applied which is used generally and widely as a sliding material, the sliding property of the sealing device can be further improved, and if a general-purpose resin is applied, the cost of materials can be reduced, so a low cost production of the sealing device becomes possible. In other words, the present application is not limited to such combined sealing devices, but can achieve the reduction of the sliding resistance with respect to resin-made sliding members (for example, seal rings, wear rings, etc.) in a simple manner.

More specifically, the present invention is able to achieve, in a sealing device provided with a sliding surface, an improvement in the sliding property of the sealing device by devising the shape of the sliding surface without regard to the characteristic or property of materials used. Accordingly, the range of selection of materials can be extended (i.e., it becomes possible to adopt inexpensive materials having not so high sliding properties), whereby the reduction in the cost of materials can be made. In addition, it can be made possible to satisfy a request for an excellent sliding property with the use of a single member, although in the past, a plurality of kinds of members are combined so as to achieve an improvement in the sliding property while supplementing their individual properties with each other. Accordingly, a reduction in the cost of materials can be made due to a reduction in the number of component members required.

BRIEF DESCRIPTION OF THE DRAWINGS

FIG. 5 is a schematic cross sectional view showing a sealing device according to a second embodiment.

FIG. 11 is a chart showing a comparison between the sliding resistances.

FIG. 13 is a schematic cross sectional view of irregularities formed by means of shot processing.

EXPLANATIONS OF REFERENCE NUMERALS

Figure 1A:
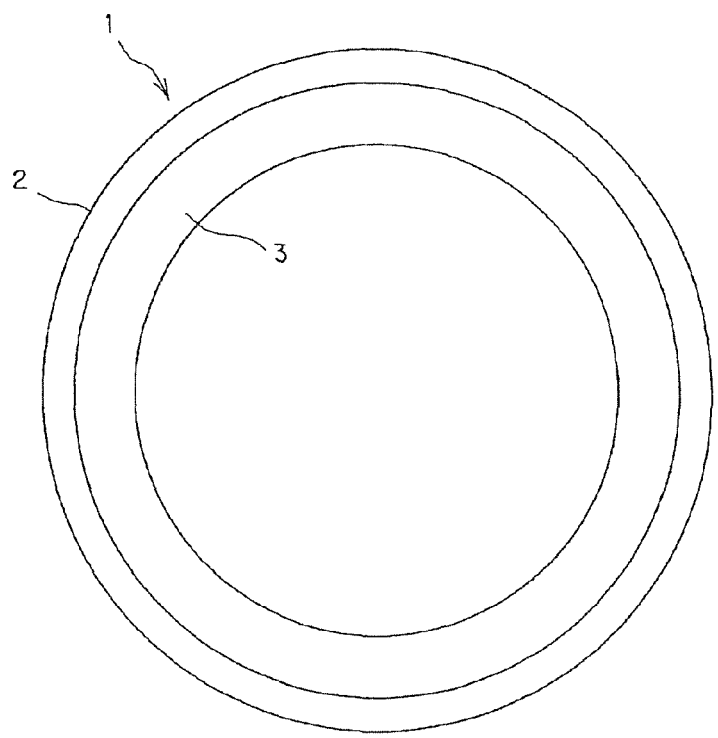
FIG. 1 is a schematic diagram showing the construction of a sealing device according to a first embodiment.

1 Sealing device
2 Seal ring
20 Outer peripheral surface
21 Side surface
22 Concave portions
23 Convex portions
23a Initial sliding surface
3 Elastic ring
4 Housing
40 Inner peripheral surface
5 Shaft
50 Annular groove
51 Side surface
52 Groove bottom
6 Annular gap

BEST MODES FOR CARRYING OUT THE INVENTION

In the following, the best mode for carrying out the present invention will be described in detail by the way of example based on the following embodiments while referring to the accompanying drawings. However, it is to be understood that the measurements, materials, shapes, relative arrangements and the like of component parts described in the embodiments should not be construed as limiting the scope of the present invention in any manner, in particular unless specified otherwise.

First Embodiment

Figure 1B:
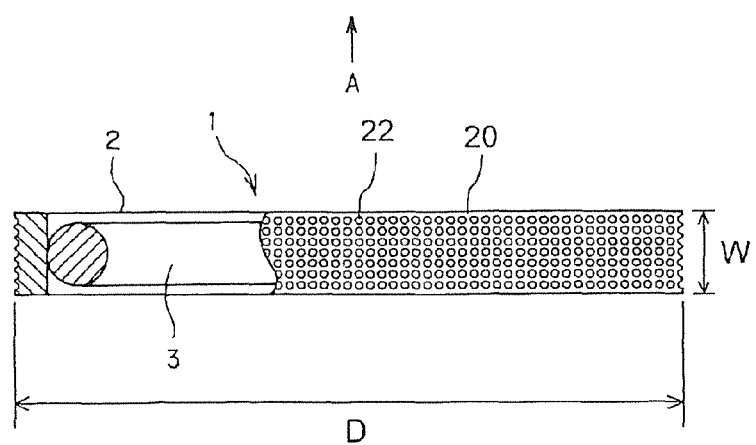
Figure 2A:
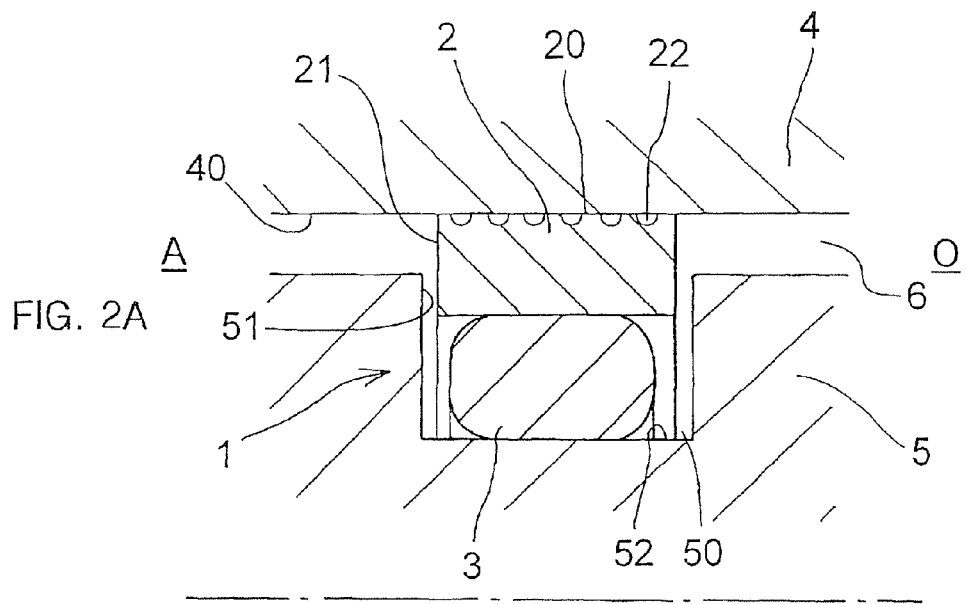
FIG. 2 is a schematic cross sectional view showing a mounted state of the sealing device.
Figure 2B:
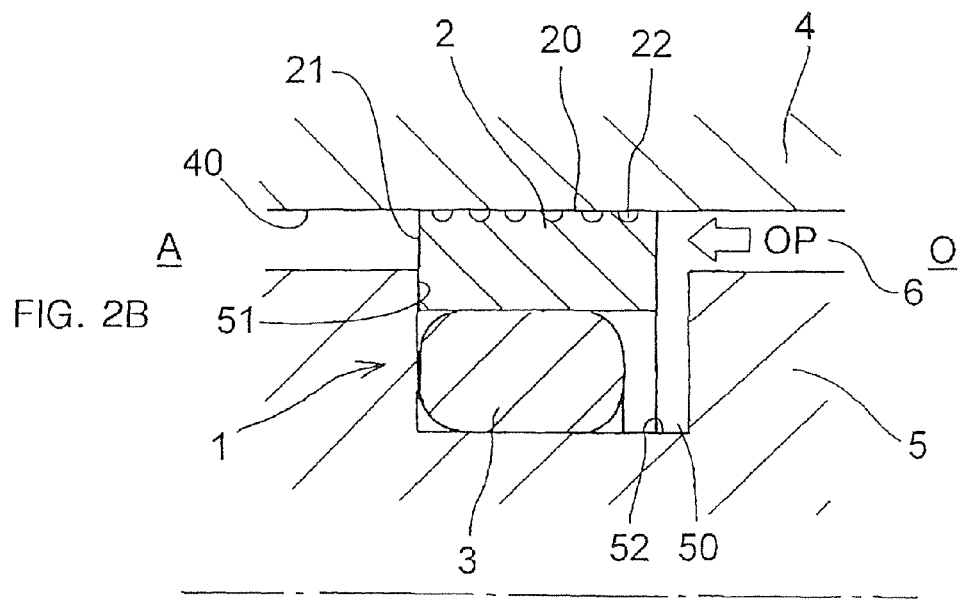

A sealing device according to a first embodiment of the present invention will be described while referring to FIG. 1 and FIG. 2. FIG. 1 is a schematic diagram showing the construction of the sealing device according to this embodiment, wherein FIG. 1A shows an appearance thereof as seen in an axial direction, and FIG. 1B is an arrow view as seen from arrow A of FIG. 1A, showing a partial cross section thereof. FIG. 2 is a schematic half cross sectional view showing a mounted state of the sealing device according to this embodiment, wherein FIG. 2A shows a state with no pressure applied, and FIG. 2B shows a state with pressure applied.

The sealing device 1 according to this embodiment is used, for example, as a sealing device for a piston in a hydraulic cylinder, i.e., a so-called piston seal that is fitted into an annular groove formed on an outer peripheral surface of the piston for sealing an annular clearance or gap between the piston and the cylinder.

The sealing device 1 is comprised of a seal ring 2 and an elastic ring 3, and is fitted into an annular groove 50 formed on an outer peripheral surface of a shaft 5 so as to seal an annular clearance or gap 6 between a housing (cylinder) 4 with a shaft hole and the shaft (a piston, a rod, or the like) 5 inserted into the shaft hole.

The seal ring 2 is an annular member of a substantially rectangular cross section, and it is arranged at an opening side of the annular groove 50. An outer peripheral surface 20 of the seal ring 2 is placed in sliding contact with an inner peripheral surface 40 of the housing 4 to form a sealing surface with respect to the housing 4. In addition, upon application of oil hydraulic pressure OF, the seal ring 2 is pushed to a side opposite to a fluid to be sealed (non-hydraulic pressure side) (A) of the annular groove 50, whereby a side surface (end face) 21 of the seal ring 2 at the side opposite to the fluid to be sealed (A) is placed into intimate contact with a side surface 51 of the annular groove 50, thereby forming a sealing surface with respect to the shaft 5.

As materials for the seal ring 2, there can be used polytetrafluoroethylene (PTFE), which is generally used widely as a sliding material, and in addition thereto, the entire general-purpose thermoplastic resins such as polyamide (PA), polyether-ether-ketone (PEEK), polyphenylene sulfide (PPS), polyacetal (POM), and so on, can also be used. In particular, polyamide, being excellent in pressure resisting property and yet low in cost, can provide the seal ring with the function of a back-up ring when used for a high pressure piston seal comprising four component members, so the number of component parts required can be reduced due to abolition of a backup ring, thus making it possible to achieve further cost reduction. In addition, for example, a polyamide resin with glass fiber mixed therein may be used, and in this case, the amount of glass fiber mixed or filled is 20-40 percent by weight, and preferably, 25-35 percent by weight. Also, other additives such as molybdenum disulfide can be used as required.

The elastic ring 3 is an annular member of a substantially circular cross section made of a rubber material such as nitrile rubber (NBR), polyurethane (PU), etc., and it is fitted under compression into between the seal ring 2 and a groove bottom 52 of the annular groove 50. The elastic ring 3 serves to urge the seal ring 2 toward the housing 4 side under the action of its elastic restoring force, so that the contact between the seal ring 2 and the housing 4 can be increased. Here, it is to be noted that the cross-sectional shape of the elastic ring 3 is not limited to the circle, but instead, a variety of kinds of shapes such as, for example, a rectangular cross section, etc., can be adopted as required.

The seal ring 2 has a plurality of concave portions 22 formed on its outer peripheral surface 20, which is a sliding surface thereof with respect to the inner peripheral surface 40 of the housing 4. The concave portions 22 are recesses (holes) which are minute with respect to the area of the outer peripheral surface 20, and are formed uniformly over the entire surface of the outer peripheral surface 20.

In a sealing device having a sliding sealing surface such as the sealing device 1 according to this embodiment, it is designed, for example, such that a part of the fluid to be sealed such as hydraulic operating oil or the like in the hydraulic cylinder can leak into between the inner peripheral surface 40 of the housing 4 and the outer peripheral surface 20 of the seal ring 2 within a range in which no substantial influence will be exerted on the operation, the sealing performance and the like of related equipment, whereby it is constructed such that lubricating films (oil films) of the fluid to be sealed are formed on sliding surfaces so as to reduce the wear and the sliding resistance of the sliding surfaces and so on.

The lubricating films formed of the fluid to be sealed, which is interposed between the sliding surfaces of the housing 4 and the seal ring 2, might become uneven or might not be formed with a sufficient thickness in the initial stage of use because the fluid to be sealed does not spread over the entire sliding surfaces, or the lubricating films, even if once formed evenly or sufficiently, might be reduced in thickness or might disappear (cause oil film shortage) because the fluid to be sealed does not stay on the sliding surfaces but gradually moves (leaks out) up to the non fluid-to-be-sealed side (A) by repeated sliding movements. When such a state occurs, wear might be caused on the inner peripheral surface 40 of the housing 4 or the outer peripheral surface 20 of the seal ring 2, and the sliding resistance of the sliding surfaces might become large, as a result of which unusual noise, stick-slip, heat generation, etc., might be generated.

In this embodiment, it is constructed such that the concave portions 22 formed on the outer peripheral surface 20 of the seal ring 2 function as oil sump holes, and hence lubricating films are liable to be formed, and at the same time, the thickness of the lubricating films are maintained in a stable manner for a long period of time. That is, the fluid to be sealed having leaked from the fluid-to-be-sealed side (O) to the sliding surfaces accumulates in the concave portions 22, so the thickness of the lubricating films is maintained by the fluid to be sealed which has thus been accumulated in the concave portions 22, thereby suppressing the generation of oil film shortage.

In addition, the concave portions 22 also function as pressure chambers between themselves and the inner peripheral surface 40 of the housing 4. That is, the pressure in the chambers defined by the concave portions 22 and the inner peripheral surface 40 of the housing 4 rises gradually due to the gradual accumulation of the fluid to be sealed in the concave portions 22, whereby there is generated a force that acts in a direction to separate the outer peripheral surface 20 of the seal ring 2 and the inner peripheral surface 40 of the housing 4 from each other. As a result, an expansion force acting on the seal ring 2 and a contact pressure acting against the inner peripheral surface 40 of the housing 4 can be reduced, thus making it possible to decrease the sliding resistance of the seal ring 2. In addition, in an annular oil groove as shown in the above-mentioned fourth technical document (FIG. 12), the volume or storage capacity of the oil groove is large and an accordingly long accumulation time is required, so it is not possible to increase the pressure therein in an early time, and hence, an accumulation of pressure can not be built up in an early stage of time, but in contrast to this, the concave portions as in the present application are so small in volume, that the accumulation of pressure can be achieved in an early time.

Moreover, the plurality of concave portions 22, being minute in comparison with the area of the outer peripheral surface 20 of the seal ring 2, are formed in a uniform manner over the entire surface of the outer peripheral surface 20, so even if a scratch or flaw or the like for placing adjacent ones of the concave portions 22 in communication with each other is made on the outer peripheral surface 20, a situation will be hard to occur that places the fluid-to-be-sealed side (O) and the non fluid-to-be-sealed side (A) in communication with each other.

Further, by the provision of the plurality of concave portions 22, it becomes possible to form the oil films in an efficient manner even when the stroke of the relative axial motion of the housing 4 and the shaft 5 is short. That is, the fluid to be sealed that forms the lubricating films is once held or retained in one of the concave portions 22 near the region-to-be-sealed side (O) with a first stroke of the shaft or piston, and is then moved to the next one of the concave portions 22 adjacent to the opposed region-to-be-sealed side (A) with a second stroke of the shaft. By repeating this, the lubricating films can be spread on the whole area of the outer peripheral surface 20.

Figure 3A:
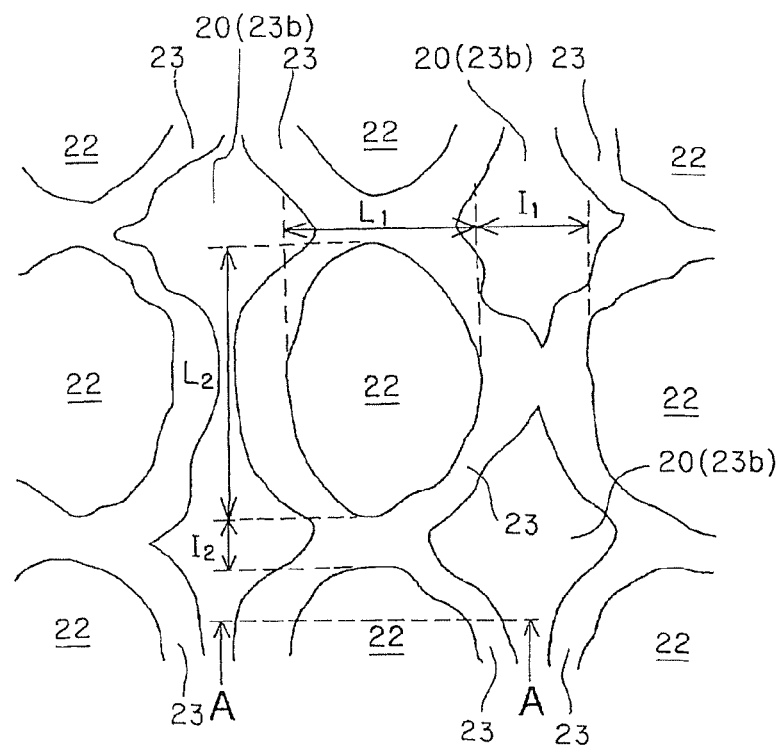
FIG. 3 is a schematic diagram showing part of an outer peripheral surface of the seal ring in an enlarged scale.
Figure 3B:
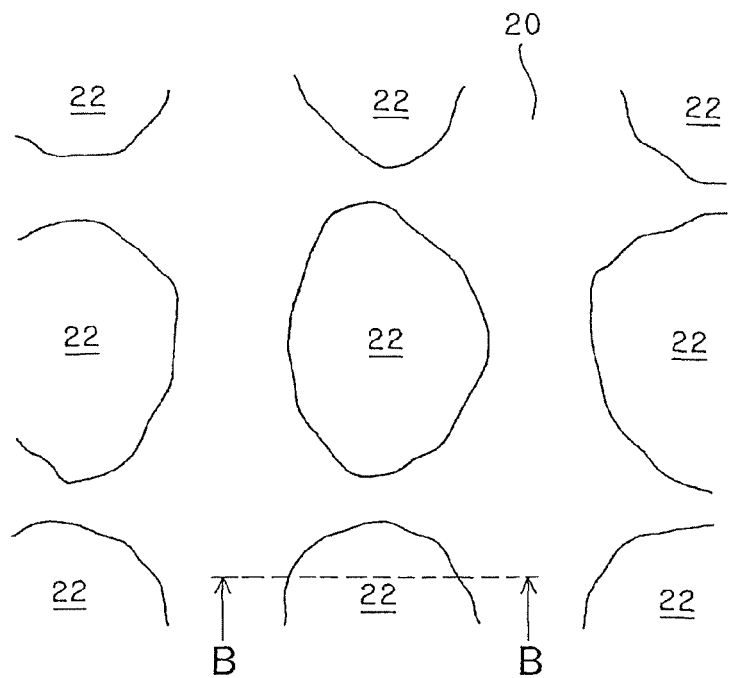

In addition, it is preferable to form the concave portions 22 by means of laser irradiation. This will be described below in detail while referring to FIG. 3 and FIG. 4. FIG. 3 is a schematic diagram that shows part of the outer peripheral surface of the seal ring 2 in an enlarged scale, wherein FIG. 3A shows a state in which convex portions 23 are formed, and FIG. 3B shows a state in which the convex portions 23 have been worn out. FIG. 4 is a schematic diagram that shows the cross section of the concave portions 22, wherein FIG. 4A is an AA section of FIG. 3A, showing a state in which the convex portions 23 are formed, and FIG. 4B is a BB section of FIG. 3B, showing a state in which the convex portions 23 have been worn out.

Figure 4A:
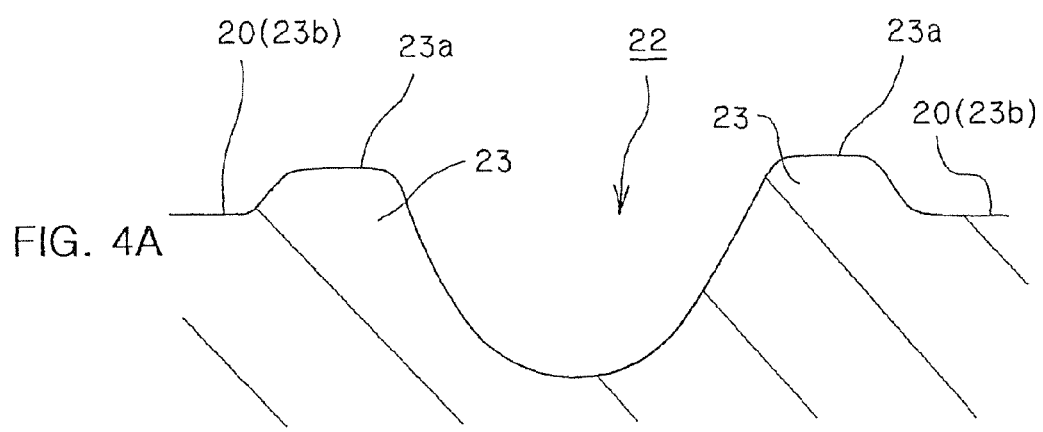
FIG. 4 is a schematic cross sectional view of concave portions.
Figure 4B:
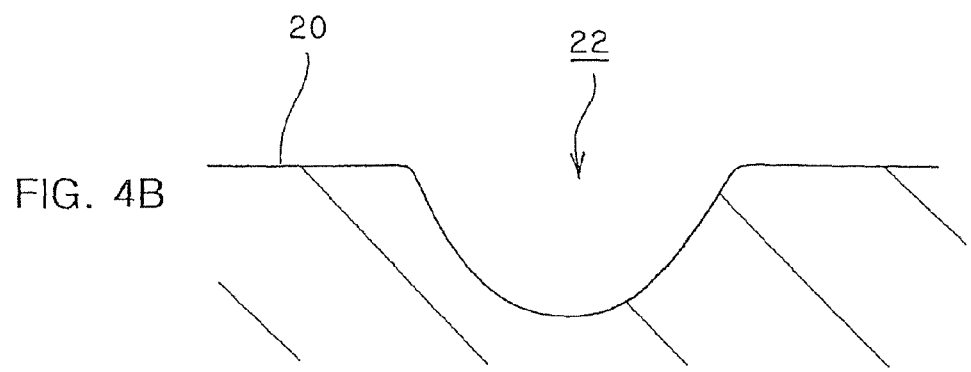

As shown in FIG. 3A and FIG. 4A, by irradiating laser to the outer peripheral surface 20 of the seal ring 2 made of a thermoplastic resin, the concave portions 22 are formed and at the same time the material melted by the irradiation heat of the laser rises around the opening edges of the individual concave portions 22 to form the convex portions 23 in such a manner as to enclose surroundings of the opening portions of the individual concave portions 22.

As shown in FIG. 4A, such concave and convex shapes formed by the laser irradiation are not pointed ones like concave and convex shapes formed by means of shot processing, but instead, the convex portions 23 each have an outer peripheral surface 20 formed to gently rise with a tip end thereof being formed into a flat face. This flat surface functions as an initial sliding surface 23a. That is, at the time of starting of the equipment such as the hydraulic cylinder or the like (operation initial stage), the initial sliding surfaces 23a of the convex portions 23 become in sliding contact mainly with the inner peripheral surface 40 of the housing 4.

At this time, in spaces 23b between individual convex portions 23, the outer peripheral surface 20 is in a state in which it is basically in non-contact with the inner peripheral surface 40 of the housing 4, so a clearance or gap is formed between the outer peripheral surface 20 and the inner peripheral surface 40 of the housing 4. The clearance or gap formed between the outer peripheral surface of the seal ring 2 and the inner peripheral surface 40 of the housing 4 in spaces 23b between these individual convex portions 23 serves as a guide passage for guiding the fluid to be sealed to the sliding surfaces, so that the fluid to be sealed is made to easily spread over the entire sliding surfaces.

In addition, the individual convex portions 23 are made into substantially collapsed shapes by being compressed at the time of pressure application thereto or by being worn in the initial stage, and hence the gaps formed between the individual convex portions 23 become in a substantially disappeared state. Also, it is constructed such that at the time before being worn out, the individual convex portions 23 are returned to their original state by elastic restoration when the pressure applied thereto is released, so gaps are formed again between the individual convex portions 23. This operation operates in such a manner that the fluid to be sealed is inhaled into the gaps between the individual convex portions 23 as if it breathes (pumping operation), and it is repeated until the convex portions 23 have been worn out.

As shown in FIG. 3B and FIG. 4B, when the convex portions 23 are worn out to disappear in accordance with the sliding movement thereof with respect to the inner peripheral surface 40 of the housing 4, the surroundings of the opening edges of the concave portions 22 in which the convex portions 23 are formed are finally made flush with the outer peripheral surface 20. At this time, a lubricating film of a sufficient thickness is formed over the entire outer peripheral surface 20 by means of the guide passage formed between the individual convex portions 23, and at the same time, the fluid to be sealed is accumulated in the individual concave portions 22 to a satisfactory extent.

Thus, at the time of starting, only the initial sliding surfaces 23a of the convex portions 23 basically slide with respect to the inner peripheral surface 40 of the housing 4, so the sliding area become small, as a result of which the sliding resistance in the initial stage, in which the lubricating film has not yet been formed over the entire sliding surface to a satisfactory extent, can be reduced. Accordingly, the generation of stick slip, which is generally liable to occur at the start of operation in which a stable lubricating film has not yet been formed on the sliding surface can be suppressed.

Moreover, since it is constructed such that the fluid to be sealed can be easily introduced into the sliding surfaces in a positive manner in the initial stage, it is possible to obtain a satisfactory sliding (lubrication) characteristic in a relatively early stage of time. That is, the fluid to be sealed can be filled into the concave portions 22 at an early time, and at the same time, stable and good lubricating films can be formed at an early time.

Here, note that if laser processing is employed as a method of forming the concave portions 22, they can be easily formed though other methods such as one using shaping dies, shot processing, etc., may be used as long as concave and convex shapes as referred to above can be formed.

Regarding the size or dimensions of the convex portions 23, if too large, they might form a flow passage that acts to place the fluid-to-be-sealed side (O) and the non fluid-to-be-sealed side (A) in communication with each other, thus resulting in leakage, so it is necessary to design the size in a manner such that the convex portions are substantially collapsed when pushed against the inner peripheral surface 40 of the housing 4 under the application of pressure.

Here, it is to be noted that such concave portions and convex portions can be easily formed because the base polymer of the seal ring made of a resin material is a thermoplastic resin. However, in case where the base polymer is a thermosetting resin such as, for example, phenol or the like, a material containing the base polymer is vaporized, without being melted, by the heat of the laser, as a consequence of which the concave portions can be formed but the convex portions are not formed around the concave portions, so it is impossible to obtain the improvement effect of the lubrication property in the initial stage.

Further, the individual concave portions 22 are uniformly formed as minute oil sump holes on the entire surface of the outer peripheral surface 20 of the seal ring 2, and as specific dimensional shapes thereof, it is preferred that, for example, with respect to the seal ring 2 having an outer diameter D of 100 mm and an axial width W of 6.96 mm, each of the concave portions 22 take a substantially conical shape having a circumferential width L1 and an axial width L2 both in the range of 100-1,000 μm, and a depth in the range of 50-200 μm. In addition, it is also preferred that the individual adjacent concave portions 22 be arranged apart from one another at a circumferential interval I1 and at an axial interval I2 both in the range of 100-300 μm.

As a specific method of producing the concave portions 22, the entire circumference of the seal ring is processed by irradiating laser within a circumferential range of about 20 mm in a pulsed manner while supporting the seal ring of the above-mentioned dimensions in a rotatable manner, and by rotating the seal ring a constant angle per irradiation in a repeated manner. It is verified that by setting a spot system for scanning lines to be about 300 μm, there were formed concave portions each having a circumferential width L1 of 346 μm, an axial width L2 of 497 μm, and a depth of 116 μm. In addition, the circumferential interval I1 and the axial intervals I2 of each concave portion at this time are 200 μm and 135 μm, respectively, and the height of each convex portion is about 10-20 μm.

Here, note that in the above explanation, a use example has been described in which counterpart members (housing and shaft), on which a sealing device is mounted, relatively move in an axial direction, and a seal ring slides in the axial direction, but the condition of use in which this embodiment can be applied is not limited to this. That is, this embodiment can be used even in a use condition in which counterpart members relatively rotate with respect to each other and a seal ring slides in a circumferential direction, and in this case, the same effects as those described above can be achieved.

Although in the above explanation, reference has been made to the case where a sealing device is fitted in an annular groove formed on an outer peripheral surface of a shaft, the present invention is not limited to this but may be constructed such that a sealing device is fitted into an annular groove formed on an inner peripheral surface of a shaft hole in a housing, and an inner peripheral surface of a seal ring is in sliding contact with an outer peripheral surface of the shaft.

Second Embodiment

A sealing device according to a second embodiment of the present invention will be described while referring to FIG. 5. FIG. 5 is a schematic cross sectional view showing the sealing device 1' according to the second embodiment. Here, note that constructions common to those of the first embodiment are identified by the same symbols and an explanation thereof is omitted. Constructions, their operational effects and the like not particularly described are similar to those in the first embodiment.

The outer peripheral surface 20 of the seal ring 2 has axially opposite sides thereof formed into taper surfaces 24, respectively. With this, the sliding area with respect to the inner peripheral surface 40 of the housing 4 becomes small, and the sliding resistance thereof can be reduced. In addition, the contact pressure of the outer peripheral surface 20 with respect to the inner peripheral surface 40 of the housing 4 can be reduced by a wedge effect that is produced by the fluid to be sealed entering a clearance or gap of a substantially wedge-shaped cross section formed between the taper surfaces 24 and the inner peripheral surface 40, and at the same time, there can be obtained an effect that the fluid to be sealed is positively introduced into the sliding surfaces.

(Verification of a Lubrication Improvement Effect)

Figure 6:
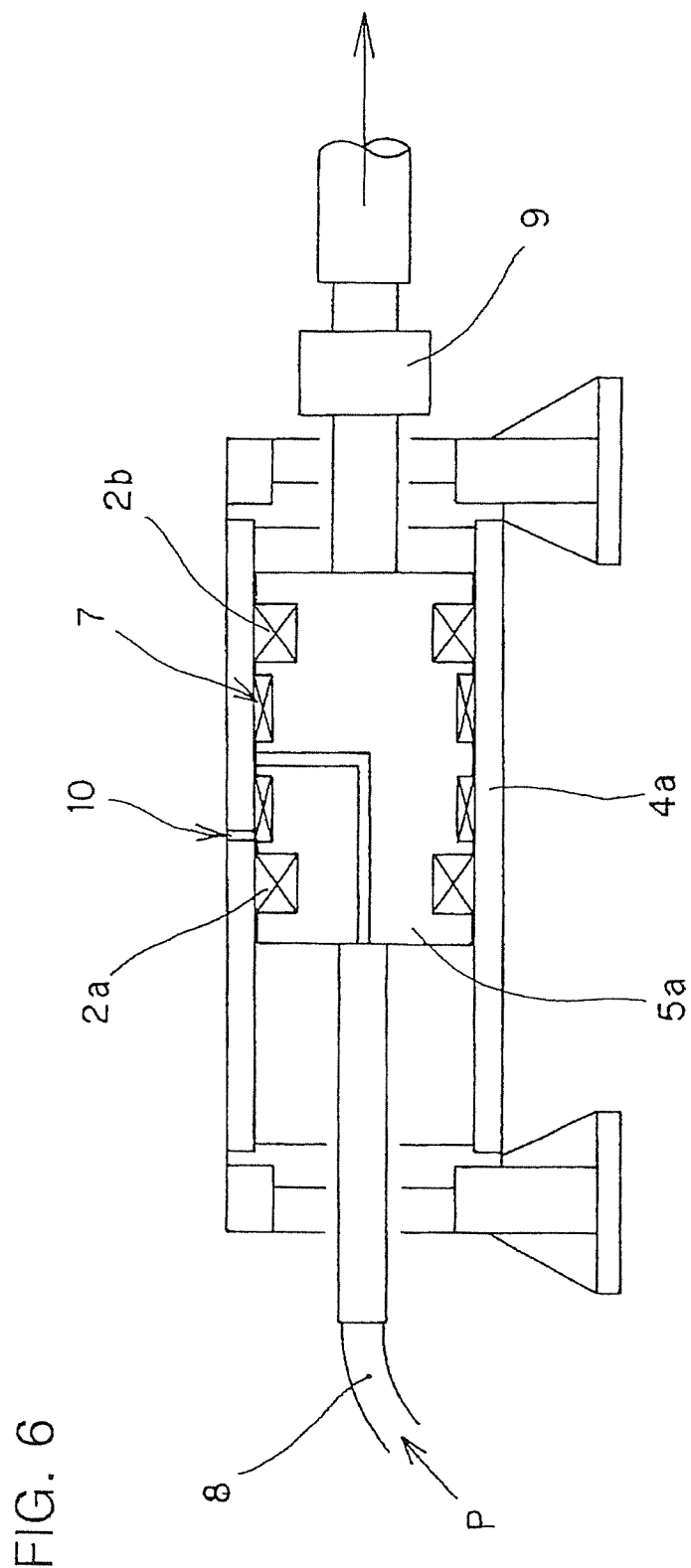
FIG. 6 is a schematic diagram showing the schematic construction of a testing device.
Figure 7:
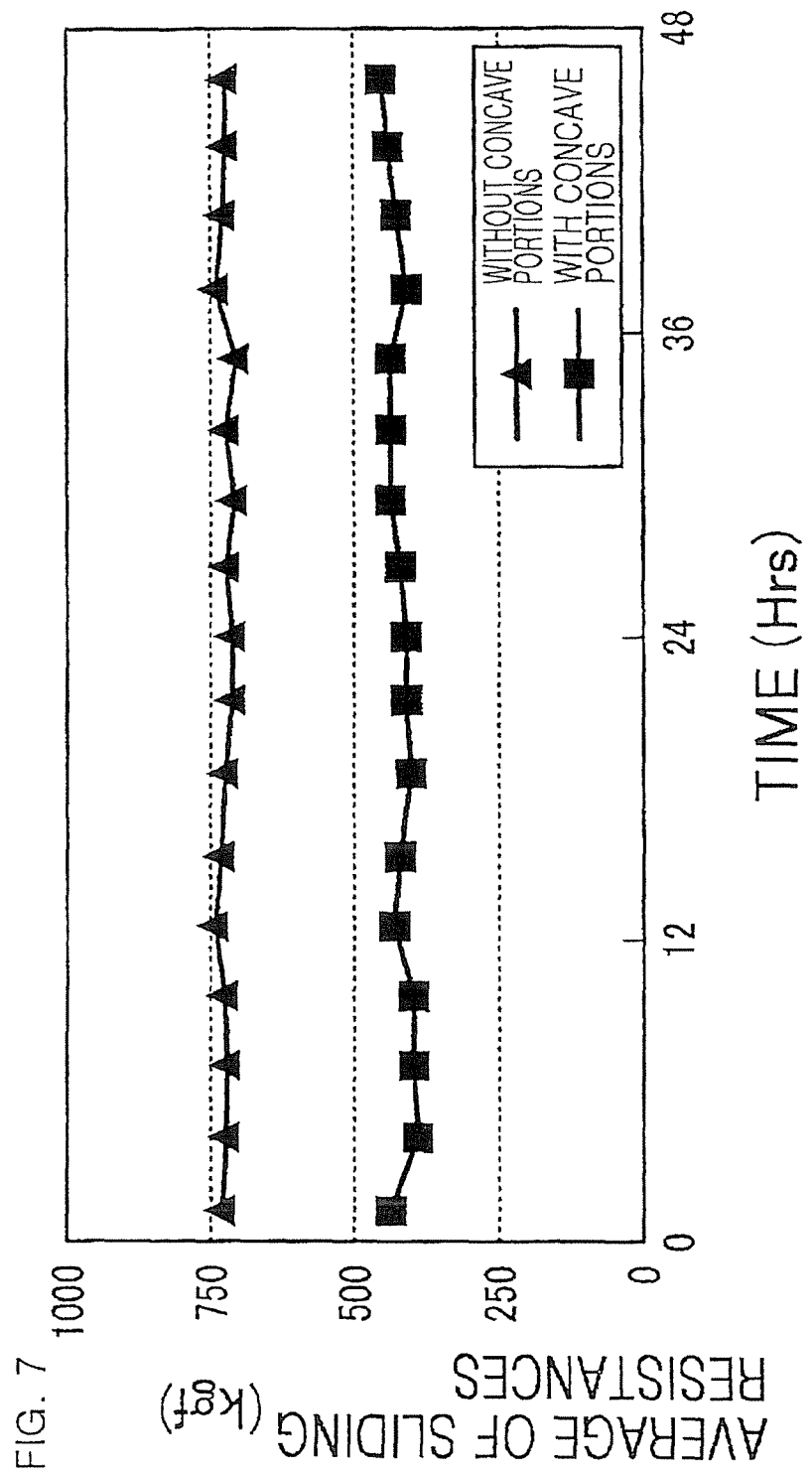
FIG. 7 is a chart showing a comparison between average values of the sliding resistances of seal rings.
Figure 8:
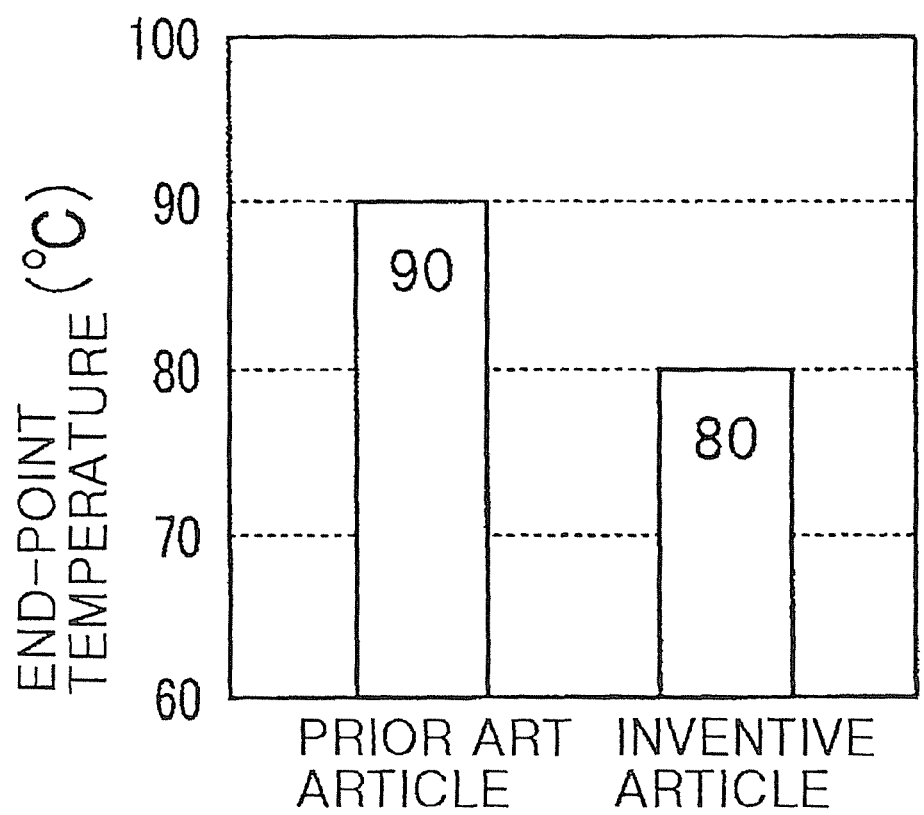
FIG. 8 is a chart showing a comparison between end-point temperatures.
Figure 9A:
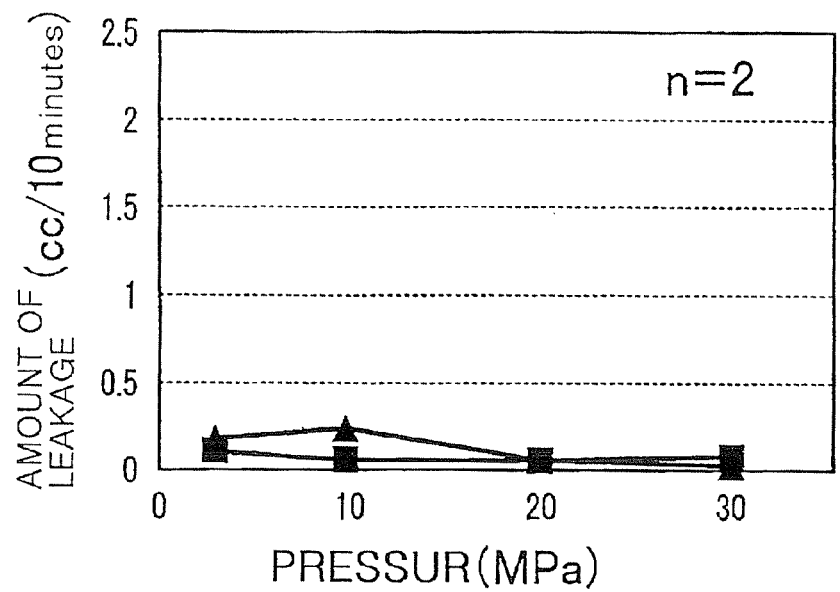
FIG. 9 is a chart showing a comparison between amounts of leakage.
Figure 9B:
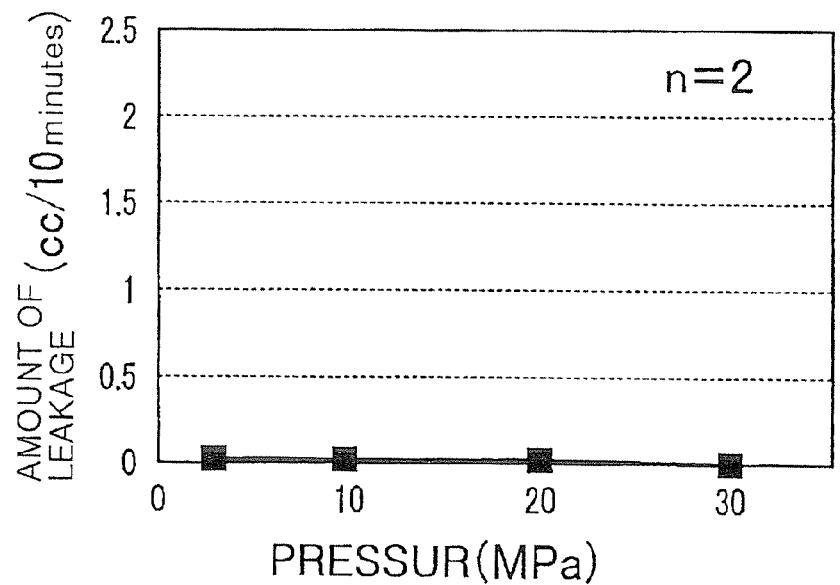
Figure 10A:
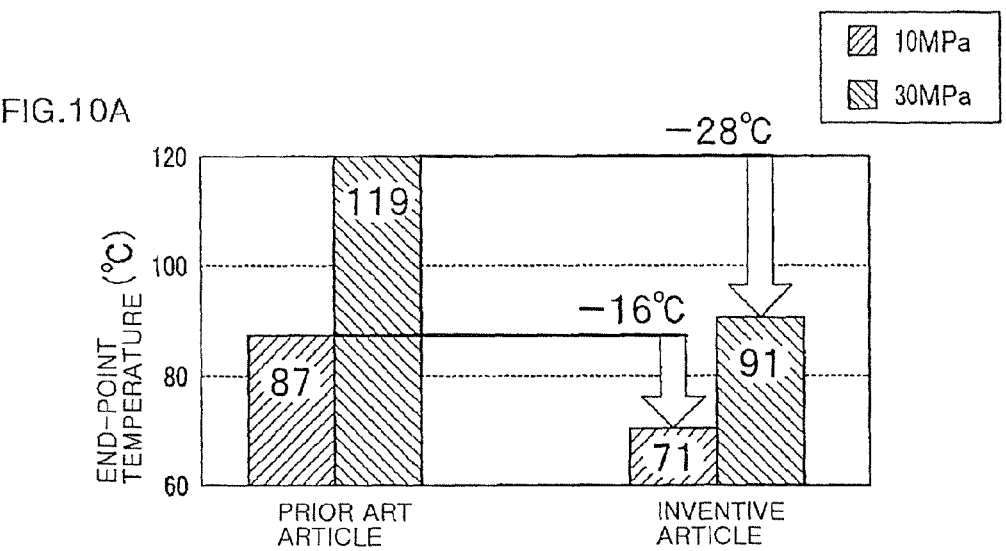
FIG. 10 is a chart showing a comparison between amounts of sliding heat generated and sliding resistances.
Figure 10B:
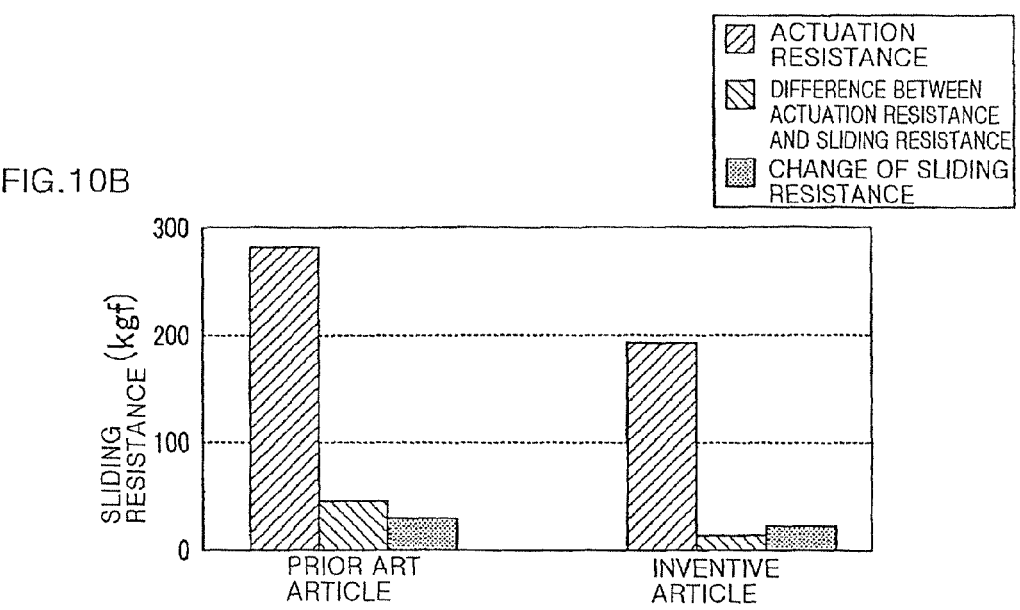

Next, the improvement effect of the lubrication property by means of the concave portions 22 will be verified based on the test results obtained by a comparison with a prior art article while referring to FIG. 6 through FIG. 11. FIG. 6 is a schematic diagram showing the schematic construction of a testing device. FIG. 7 is a chart showing a comparison between average values of the sliding resistances of seal rings with and without concave portions. FIG. 8 is a chart in which a comparison is made between end-point temperatures according to the presence or absence of the concave portions. FIG. 9 is a chart in which a comparison is made between amounts of leakage according to the presence or absence of the concave portions, wherein FIG. 9A shows an amount of leakage in the prior art article, and FIG. 9B shows an amount of leakage in an article of an embodiment of the present invention, respectively, these figures being the measurement results with more large number of samples. FIG. 10 is a chart in which a comparison is made between the generation of sliding heat and the sliding resistance according to the presence or absence of the concave portions, wherein FIG. 10A shows end-point temperatures, and FIG. 10B shows the sliding resistances, respectively. FIG. 11 is a chart in which a comparison is made between the sliding resistances according to the difference in the cross-sectional shape.

As shown in FIG. 6, the testing device is provided with a cylinder 4a, and a piston 5a that is connected with an unillustrated driving cylinder and is constructed to make a stroke in the interior of the cylinder 4a in an axial direction, wherein sealing devices 2a and 2b in the form of evaluation samples are fitted into annular grooves formed on an outer peripheral surface of the piston 5a at its opposite ends, respectively. In addition, it is further constructed such that a wear ring 7 is fitted on the piston between the two samples, and pressure is applied between the two samples while passing through the interior of the piston 5a by way of a hose 8. A reference numeral 9 denotes a load cell, and a reference numeral 10 denotes a wall temperature measurement part that measures the wall temperature of the cylinder 4a.

A constant pressure of 10 MPa is applied between the two samples, and the piston 5a is caused to stroke by means of the driving cylinder, with the sealing devices 2a, 2b being acted by the pressure, whereby the sealing devices 2a, 2b are driven to slide with respect to the inner peripheral surface of the cylinder 4a. The speed of the stroke is set to 50 mm/sec, and the length of the stroke is set to 100 mm.

The wall temperature of the cylinder 4a is caused to rise by the generation of heat due to the stroke of the piston 5a, and the temperature at the time when the rising of the wall temperature has been saturated is assumed to be an end-point temperature. In addition, the load that is required for the stroke when the end-point temperature has been reached is measured by the load cell 9, and the starting or actuation resistance and the sliding resistance are gathered from the waveform of the load thus measured.

A sealing device according to the above-mentioned first embodiment, i.e., one having a plurality of concave portions formed on an outer peripheral surface (sliding surface) of a seal ring, was used as an embodiment or inventive article, and a seal ring having no concave portion formed thereon according to the prior art was used as a prior art article, wherein comparisons were made among a variety of kinds of values such as end-point temperatures, sliding resistances, etc.

As shown in FIG. 7, with respect to the average value of the sliding resistances, the prior art article without concave portions changes at a value of about 750 kgf or less, whereas the inventive article with the concave portions changes in a range of about 400-450 kgf. That is, it is found that with respect to the average value of the sliding resistances, the inventive article is reduced by about 40 percent of the prior art article.

As shown in FIG. 8, with respect to the end-point temperatures, the prior art article without concave portions is 90 degrees Celsius, whereas the inventive article with the concave portions is 80 degrees Celsius. Thus, the inventive article is lower by 10 degrees Celsius than the prior art article. That is, it is found that the inventive article is less prone to be influenced by the generation of heat due to sliding movements as compared with the prior art article.

As shown in FIG. 9, substantially no leakage occurred in either of the prior art article and the inventive article, and hence, the provision of the concave portions resulted in no increase in the amount of leakage. That is, it is found that the presence or absence of the concave portions does not influence the sealing property or performance of the seal ring.

As shown in FIG. 10, the generation of sliding heat in the inventive article is decreased by 16 degrees Celsius at 10 MPa, and by 28 degrees Celsius at 30 MPa, with respect to the prior art article. In addition, the starting or actuation resistance (the maximum value of the sliding resistance when the seal ring begins to slide) is reduced by about 100 kgf, and the difference between the starting resistance and the sliding resistance (the sliding resistance during sliding movement after actuation) and the sliding resistance change are also reduced, respectively. That is, it is found that the sliding property at the time of actuation (starting) has been improved, and at the same time, the sliding property thereafter (after the starting period has elapsed) has also been improved. In addition, it is found that a heat generation reducing effect becomes greater in accordance with increasing pressure in use.

Figure 12:
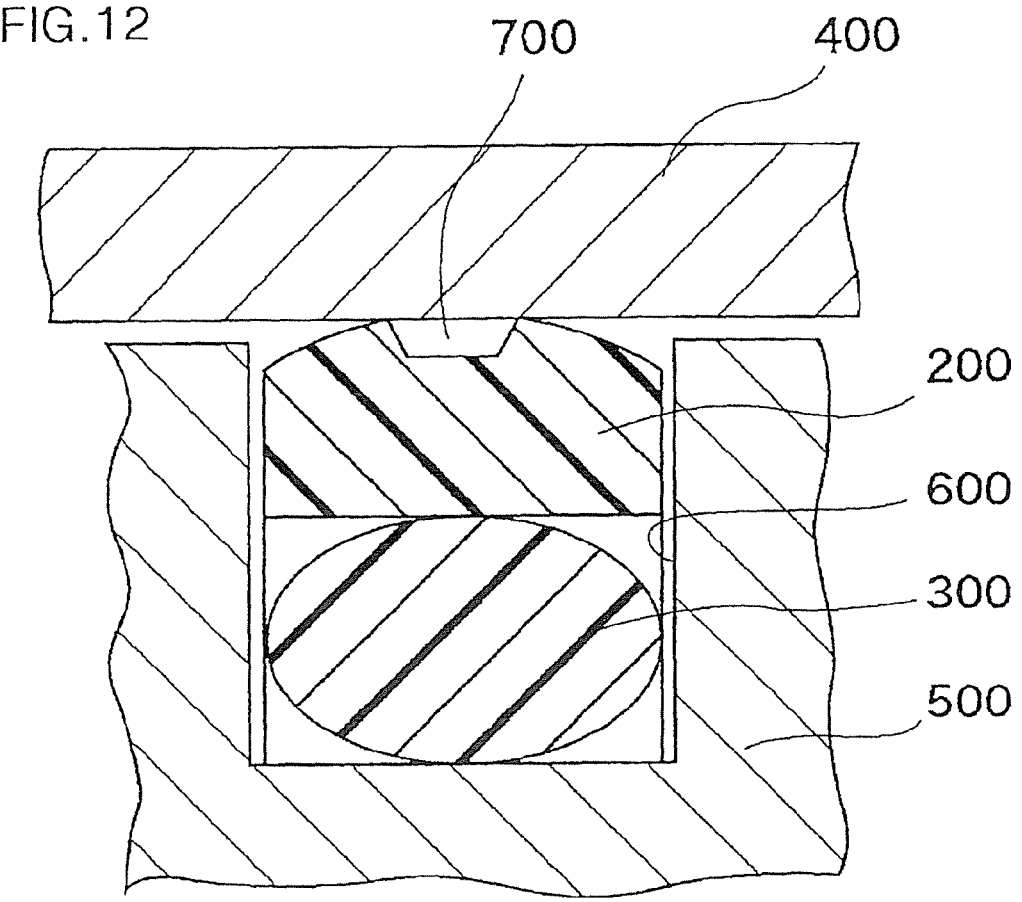
FIG. 12 is a schematic cross sectional view of a sealing device according to the prior art.

In FIG. 11, the changes in the sliding resistance (Fr) according to the difference in the shape of the sliding surface (the outer peripheral surface of the seal ring) are shown. Here, one having no concave portion formed on its sliding surface is used as a prior art article 1, and another one having an annular groove formed on its sliding surface, for example, as in the prior art example shown in FIG. 12, is used as a prior art article 2, whereas a further one having a plurality of minute concave portions formed uniformly over the whole of its sliding surface as in the above-mentioned first embodiment is used as an inventive article, and these articles are respectively compared with one another.

As shown in FIG. 11, the prior art article 2 having the annular groove formed on the sliding surface is reduced in either of the actuation resistance, the difference between the starting resistance and the sliding resistance, and the change of the sliding resistance, with respect to the prior art article 1 having the flat sliding surface. However, the inventive article having minute concave portions formed in plurality and uniformly over the whole of the sliding surface is further reduced in either of these values with respect to the prior art article 2. That is, it is found that a sliding property improving effect is greater, in the case of the uniform formation of a multitude of minute concave portions on the whole of its sliding surface as in the embodiments of the present invention, than in the case of the formation of a single, or a small number of, relatively large groove-like region(s) as in the prior art example shown in FIG. 12.

The invention claimed is:

1. A sealing device which is fitted into an annular groove formed in one of a housing with a shaft hole and a shaft inserted into said shaft hole and serves to seal an annular gap between these two members, and which includes a seal ring made of a resin that is in sliding contact with the other of said two members, and an elastic ring that is fitted between said seal ring and said annular groove, wherein:

said seal ring has a plurality of concave portions formed on its sliding surface which is in sliding contact with the said other member; and said seal ring has convex portions which are formed so as to enclose said concave portions, respectively, and which rise from said sliding surface and at the same time have initial sliding surfaces, respectively, said sliding surface between said convex portions being relatively higher than said concave portions, said concave portions being formed as separate laterally and circumferentially spaced concave features.

2. The sealing device as set forth in claim 1, wherein said concave portions are formed by irradiating laser to said sliding surface, and said convex portions are formed by a material which is melted by the irradiation of the laser to rise around opening portions of said concave portions, respectively.

3. The sealing device as set forth in claim 1, wherein, said seal ring is made of a resin material of which a base polymer is thermoplastic resin.

4. A method for producing a sealing device which is fitted into an annular groove formed in one of a housing with a shaft hole and a shaft inserted into said shaft hole and serves to seal an annular gap between these two members, and which includes a seal ring made of a resin that is in sliding contact with the other of said two members, and an elastic ring that is fitted between said seal ring and said annular groove, wherein said seal ring has a plurality of concave portions formed on its sliding surface which is in sliding contact with the said other member, and said seal ring has convex portions which are formed so as to enclose said concave portions, respectively, and which rise from said sliding surface and at the same time have initial sliding surfaces, respectively, comprising:

forming said concave portions by irradiating laser to said sliding surface, said concave portions being formed as separate laterally and circumferentially spaced concave features; and forming said convex portions by rising of a material around opening portions of said concave portions, respectively, which is melted by the irradiation of the laser.

5. The method for producing the sealing device as set forth in claim 4, wherein, said seal ring is made of a resin material of which a base polymer is a thermoplastic resin.

* * * * *